(12) United States Patent
Kwok

(10) Patent No.: US 12,020,525 B2
(45) Date of Patent: Jun. 25, 2024

(54) PROPERTY MANAGEMENT SYSTEMS

(71) Applicant: Dominus Systems, Limited, Hong Kong (CN)

(72) Inventor: Wing Yee Sean Zee Kwok, Hong Kong (CN)

(73) Assignee: Dominus Systems, Limited, Hong Kong (CN)

( * ) Notice: Subject to any disclaimer, the term of this patent is extended or adjusted under 35 U.S.C. 154(b) by 219 days.

(21) Appl. No.: 17/628,966

(22) PCT Filed: Jul. 31, 2020

(86) PCT No.: PCT/IB2020/057258
§ 371 (c)(1),
(2) Date: Jan. 21, 2022

(87) PCT Pub. No.: WO2021/019508
PCT Pub. Date: Feb. 4, 2021

(65) Prior Publication Data
US 2022/0262184 A1 Aug. 18, 2022

(30) Foreign Application Priority Data
Jul. 31, 2019 (HK) .................................. 19127526.2

(51) Int. Cl.
*G07C 9/25* (2020.01)
*G06Q 50/163* (2024.01)
(52) U.S. Cl.
CPC ........... *G07C 9/253* (2020.01); *G06Q 50/163* (2013.01)

(58) Field of Classification Search
CPC .......... G07C 9/253; G07C 9/20; G07C 11/00; G06Q 50/163
See application file for complete search history.

(56) References Cited

U.S. PATENT DOCUMENTS 6,394,356 B1 * 5/2002 Zagami .................. G07C 9/253
235/382
10,360,744 B1 * 7/2019 Kerzner ................. H04N 7/185
(Continued)

FOREIGN PATENT DOCUMENTS

| CN | 103383785 A | 11/2013 |
| CN | 107230265 A | 10/2017 |

(Continued)

OTHER PUBLICATIONS

International search report of PCT Patent Application No. PCT/IB2020/057258 issued on Dec. 9, 2020.

*Primary Examiner* — An T Nguyen

(57) ABSTRACT

A property management apparatus for managing visitor access to a managed premises. The apparatus is configured to execute stored instructions to receive visit information of a proposed visitor from a user frontend through a data communication link, to store the visit information on the data storage, and to register the proposed visitor as an authorized visitor after receipt of the visit information. The visit information comprises information of an accessible destination within the premises and visit conditions. The user frontend is pre-registered with the apparatus as associated with an associated address within the premises, and the apparatus is to operate to identify the associated address upon data communication connection with the user frontend.

19 Claims, 6 Drawing Sheets

(56) References Cited

U.S. PATENT DOCUMENTS

Figure 1:
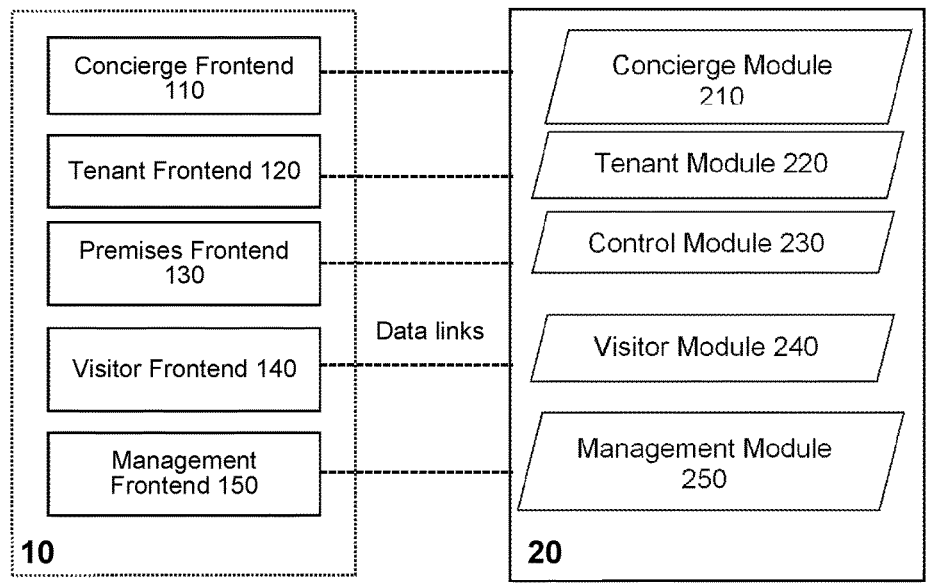

| | | | | |
|---|---|---|---|---|
| 10,854,027 B1* | 12/2020 | Lucks | ............... | G07C 9/253 |
| 11,055,943 B2* | 7/2021 | Valder | ............... | G07C 9/23 |
| 11,145,016 B1* | 10/2021 | Brophy | ............... | G06Q 30/0645 |
| 2006/0000901 A1* | 1/2006 | Haddad | ............... | G07C 11/00 |
| | | | | 235/380 |
| 2007/0273474 A1* | 11/2007 | Levine | ............... | G05B 15/02 |
| | | | | 340/5.28 |
| 2012/0310852 A1* | 12/2012 | Ramalingamoorthy | | |
| | | | | G06Q 10/00 |
| | | | | 705/323 |
| 2013/0200994 A1* | 8/2013 | Kannan | ............... | G05B 15/02 |
| | | | | 340/5.2 |
| 2013/0292467 A1 | 11/2013 | Avs et al. | | |
| 2015/0121465 A1 | 4/2015 | Berns et al. | | |
| 2016/0049029 A1* | 2/2016 | Kappeler | ............... | G07C 9/22 |
| | | | | 340/5.61 |
| 2018/0151010 A1 | 5/2018 | Kusens et al. | | |
| 2019/0035190 A1* | 1/2019 | Szczygiel | ............... | G07C 9/00309 |
| 2019/0197492 A1* | 6/2019 | Shah | ............... | G06K 19/06028 |
| 2020/0096346 A1* | 3/2020 | Dhandapani | ............... | G06Q 10/02 |
| 2020/0233389 A1* | 7/2020 | Ma | ............... | H04L 9/3247 |
| 2020/0320808 A1* | 10/2020 | Valder | ............... | G07C 9/23 |
| 2021/0027559 A1* | 1/2021 | Fisher | ............... | G06Q 10/02 |
| 2021/0304542 A1* | 9/2021 | Valder | ............... | G07C 9/27 |

FOREIGN PATENT DOCUMENTS

| | | | | |
|---|---|---|---|---|
| CN | 110021085 A | | 7/2019 | |
| KR | 20160014186 A | * | 2/2016 | |
| WO | WO-2012130727 A1 | * | 10/2012 | ......... G07C 9/00031 |
| WO | WO-2017140240 A1 | * | 8/2017 | |
| WO | 2018014346 A1 | | 1/2018 | |
| WO | 2018095182 A1 | | 5/2018 | |

* cited by examiner

Access Controller 132

PROPERTY MANAGEMENT SYSTEMS

FIELD

The present disclosure relates to property management systems, and more particularly to property management systems comprising an access management system for managing entry to and/or exit from a managed property. More specifically, the disclosure relates to computer-based access control systems or computer-based access authorization systems comprising a visitor management apparatus or module.

BACKGROUND

Computer-based access management systems such as access control systems or access authorization systems are widely used to facilitate access control such as access control to premises. With the availability of smart city solutions such as smart home solutions, smart building solutions and smart office solutions, sophisticated visitor management systems which are computer and application software-base are in demand.

DISCLOSURE

A property management apparatus ('host apparatus') and a method of property management are disclosed. The host apparatus comprises a data storage, a processor and a data communication frontend. The host apparatus is configured to operate as a visitor management apparatus in a mode of operation and in operation is to execute stored instructions to receive visit information of a proposed visitor from a user frontend through a data communication link, to store the visit information on the data storage, and to register the proposed visitor as an authorized visitor after receipt and/or verification of the visit information. The visit information may comprise information of an accessible destination within the premises and at least a visit condition such as a visit schedule. The user frontend is pre-registered with the apparatus as associated with an associated address within the premises. The apparatus is to operate to identify the associated address upon data communication connection with the user frontend. The apparatus is to generate a machine-readable visitor pass comprising the visit information. The accessible destination may be the associated address and/or area of utilities or amenities within the premises. The associated address is an example of a specific destination. The user frontend comprises a user apparatus and a set of computer executable instructions dedicated for use by registered users including authorized users.

The method, which may be referred to as a visitor management method, is preferably for use by a machine such as a computer-based host apparatus to manage visitor access to premises managed. The method comprises: the host determining an associated address which is associated with a user apparatus when data communication is established between the user-apparatus and the host, receiving visit information from the user-apparatus, and generating an access pass comprising the visit information.

The method may comprise sending the access pass to the user apparatus or to a designated channel such as a social media link or a website for retrieval, for example, by a user or by an authorized visitor.

The method may comprise the host sending a request to the user apparatus requiring input of a visit condition or visit conditions such as a visit schedule and/or a visit destination or destinations.

The visitor management apparatus may be part of a computer-operated property management system managing the premises, or may be devised as a computer-operated module which is to cooperate with a computer-operated property management system to facilitate management of the premises.

The visitor management apparatus provides users and the property management with a better and more convenient overview and control of visitor authorization, visitor scheduling, visitor presence, as well as well documented visitor records and logs for ease of retrieval.

The apparatus may comprise a computer-operated access controller and the access controller comprises a microcontroller, a data reader and a data communication interface, which is a type of data communication frontend. The data reader is to operate to detect or read the visit information on the visitor pass and the microcontroller is to operate to transmit the visit information detected or read to the processor through operation of the data communication interface. The processor is to execute stored instructions to determine whether the visitor pass is effective and to operate the access controller to permit or deny entry to the premises according to outcome of determination.

Outcome of determination is positive and entry is authorized by the apparatus if the visitor pass is read by the apparatus within the visit schedule and negative and entry is denied by the apparatus if read outside the visit schedule.

The visitor pass may comprise an access authorization code, and wherein the apparatus is to detect or read the access authorization code, to extract the visit information using the access authorization code, and to determine whether the visitor pass is effective with reference to the access authorization code.

The access authorization code may be a digital code which is not human perceivable.

The access authorization code may be a unique code which is specific to the visit information and generated by the apparatus.

In some embodiments, the apparatus is to execute stored instructions to obtain and store personal particulars of a person holding the visitor pass on a first visit to the premises, and to register the person as an authorized visitor on a visitor database on the first visit.

The apparatus may operate to connect the personal particulars with the visit information, and to retrieve the personal particulars during subsequent visits by the authorized visitor.

The visit information may comprise a visitor category which is assigned to the visitor by the user frontend when in data communication with the apparatus.

The apparatus may operate to give the user frontend an authorization to register a person as an authorized visitor to the accessible destination, and wherein the authorization is commensurate with the associated address of the user frontend.

The apparatus may operate to transmit visitor information specific to the associated address of the user frontend when the user frontend is in data communication with the apparatus, and wherein the visitor information includes visit information of a scheduled visit or scheduled visits, and/or status of a scheduled visit including whether an authorized visitor is on premises, has entered the premises, and/or has left the premises.

The apparatus may comprise a tenant frontend which is to execute stored instructions to data communicate and interact with the user frontend; wherein the tenant frontend is to determine the associated address which is connected with the user frontend when data communication between the user frontend and the tenant frontend is established; and wherein the tenant frontend is to operate to accept the visit information which is provided by the user frontend and to forward the visit information together with the associated address to a system backend where a database of visit information connected with the premises is stored.

The tenant frontend may link to the associated address as an authorizing source.

The apparatus may operate to determine whether the authorized visitor is a first-time visitor upon detection of the visitor pass and to proceed to procure first-time visitor registration procedures if the authorized visitor is determined by the apparatus as a first-time visitor. The first-time visitor registration procedures may include collection of personal particulars on-site or on premises and the collected personal particulars are to be uploaded to the apparatus for storage.

The apparatus may comprise a concierge frontend which is operable by an attendant to retrieve stored personal particulars of a visitor for verification when a visitor pass is presented to the apparatus.

The apparatus may operate to classify the visitor pass as an entry pass or as an exit pass, wherein the apparatus is to classify the visitor pass as an entry pass if the visitor pass has no entry record after a last exit or no entry record at all; and wherein the apparatus is to classify the visitor pass as an exit pass if the visitor management module has no exit record after an entry.

A user module for operating with the visitor management apparatus is disclosed. The user module comprises a computer-based user apparatus executing a set of stored user frontend instructions. The user module is to establish data communication with the visitor management apparatus using a computer-operated account which is registered for the associated address. The user module is operable to provide visitor authorization and to data communicate the visitor authorization to the visitor management apparatus. The visitor authorization is connected with or in respect of the associated address.

The user module may be a smart phone executing an application software.

A user may operate the user module to modify, cancel or revoke a scheduled visit.

The apparatus will upon receipt of the modification, cancellation or revocation instructions update the visitor database.

FIGURES

Figure 1A:
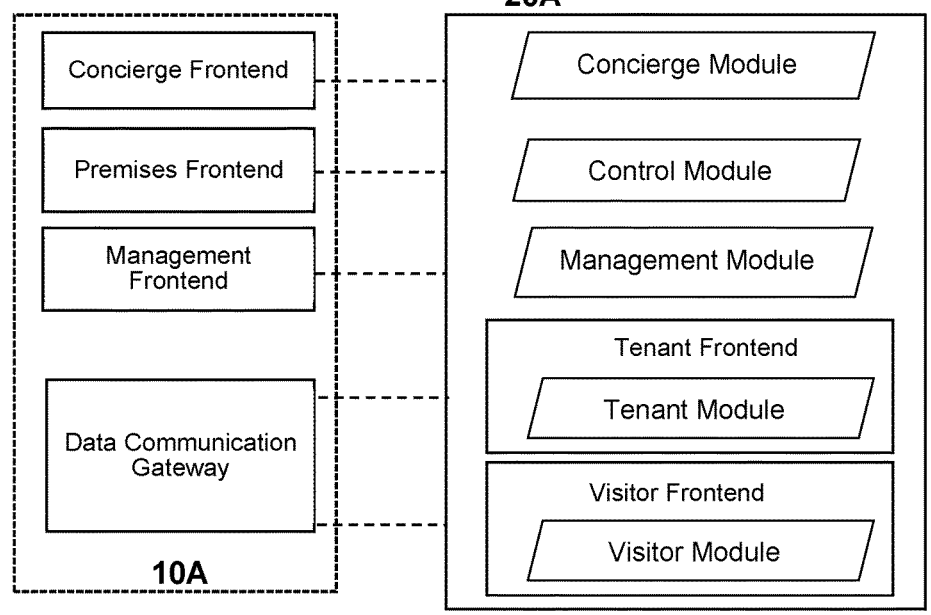
Figure 2A:
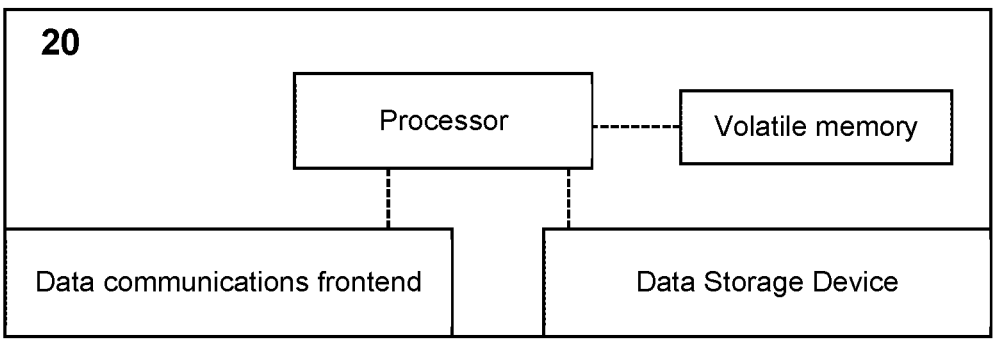
Figure 2B:
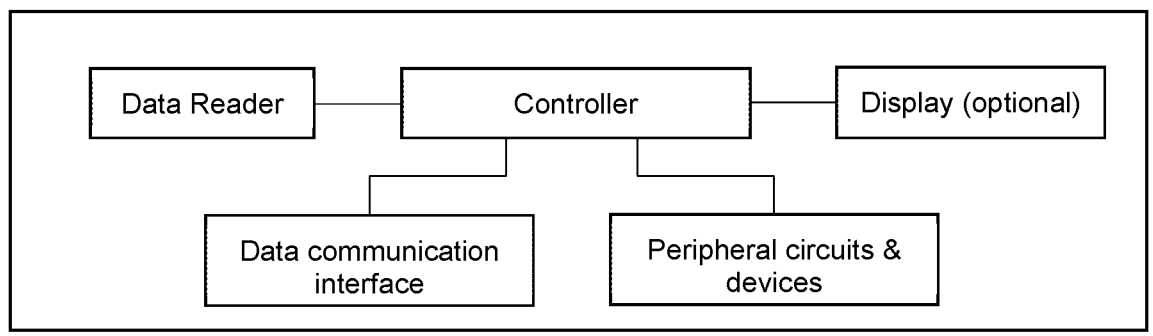
Figure 3:
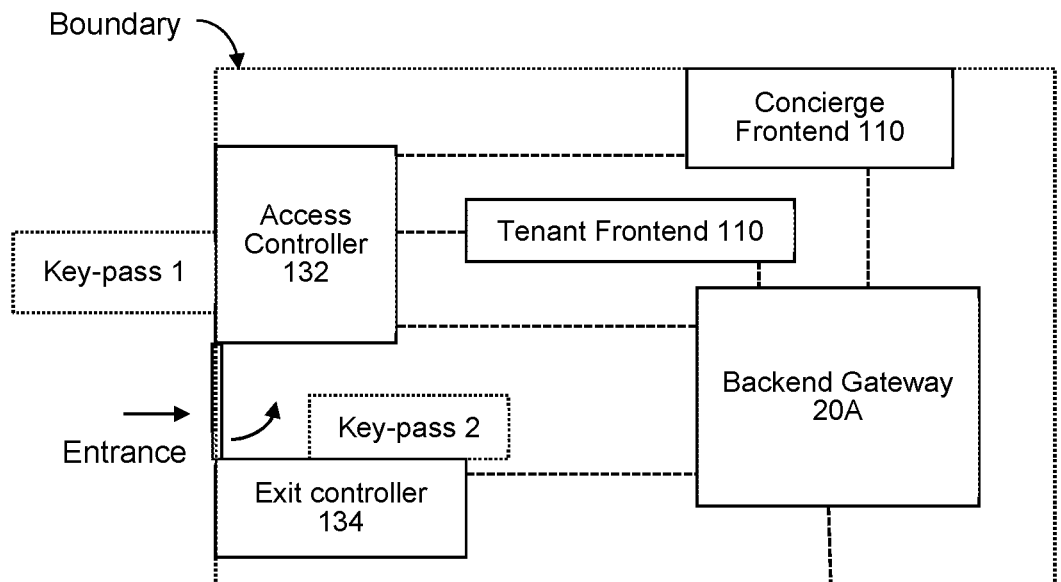
Figure 4:
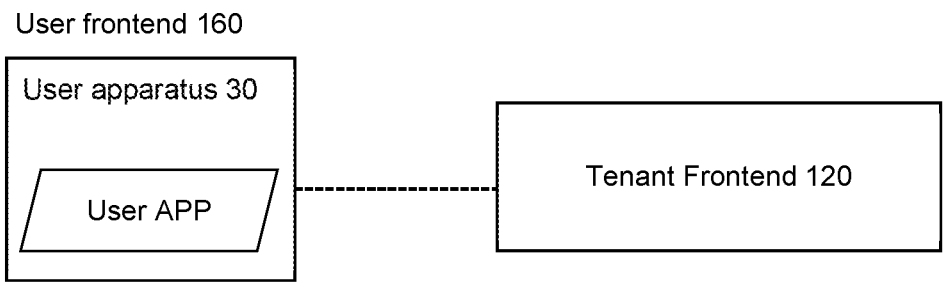
Figure 5:
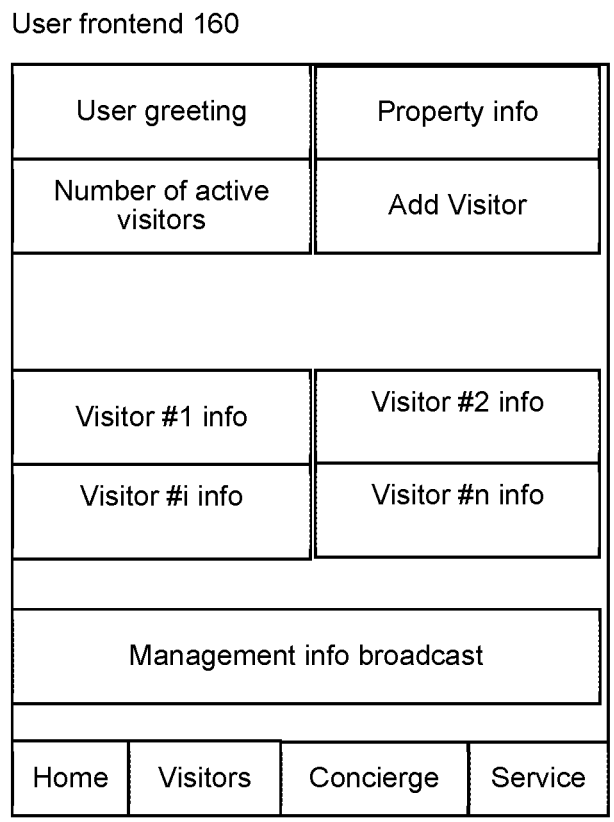
Figure 6:
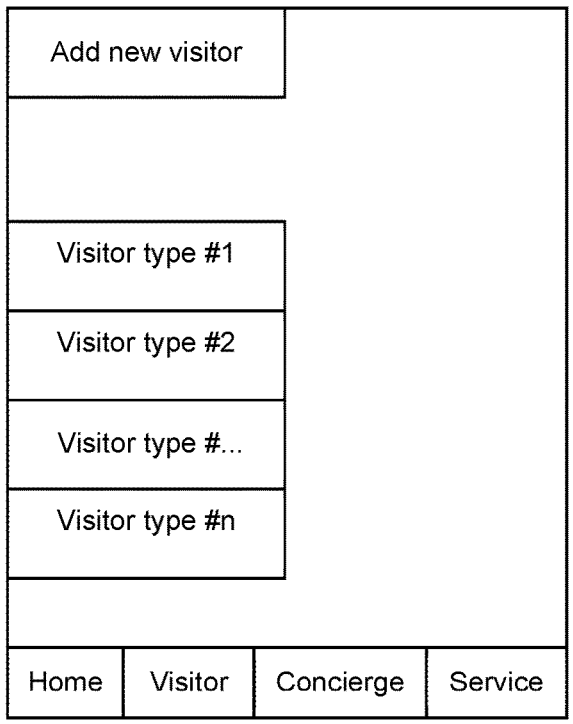
Figure 7:
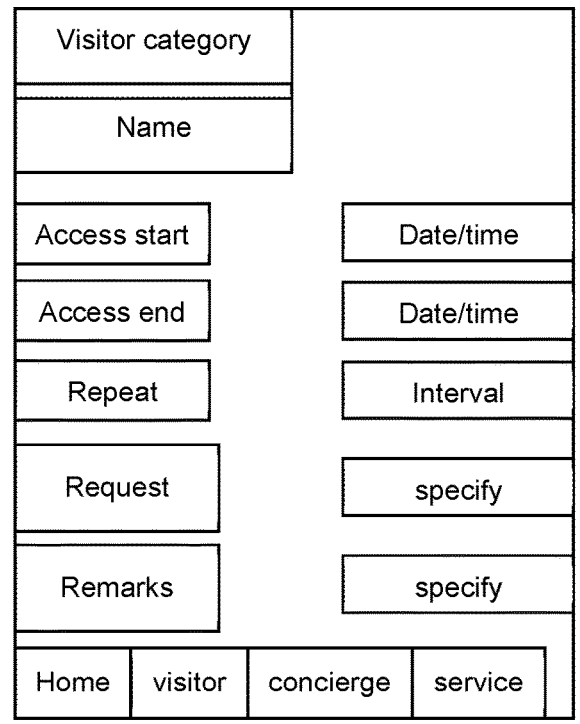
Figure 8:
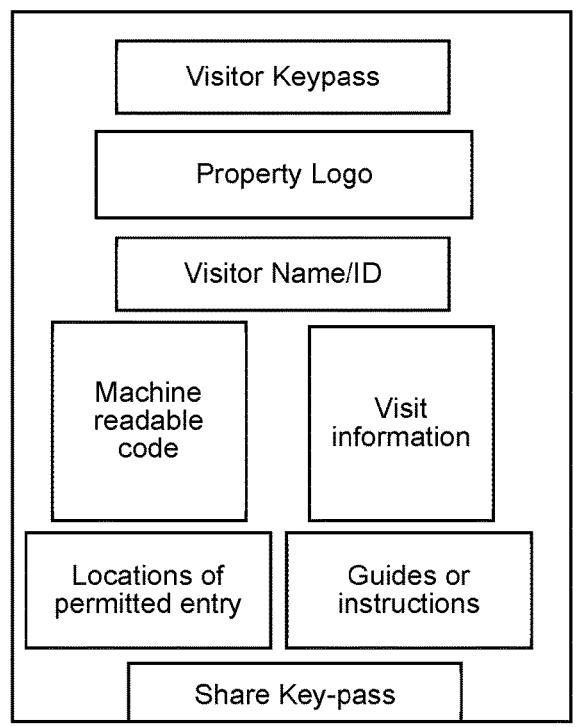
Figure 9:
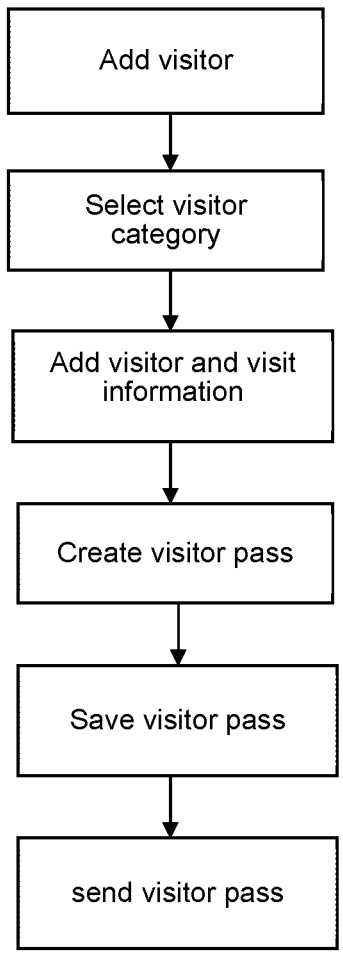
Figure 10:
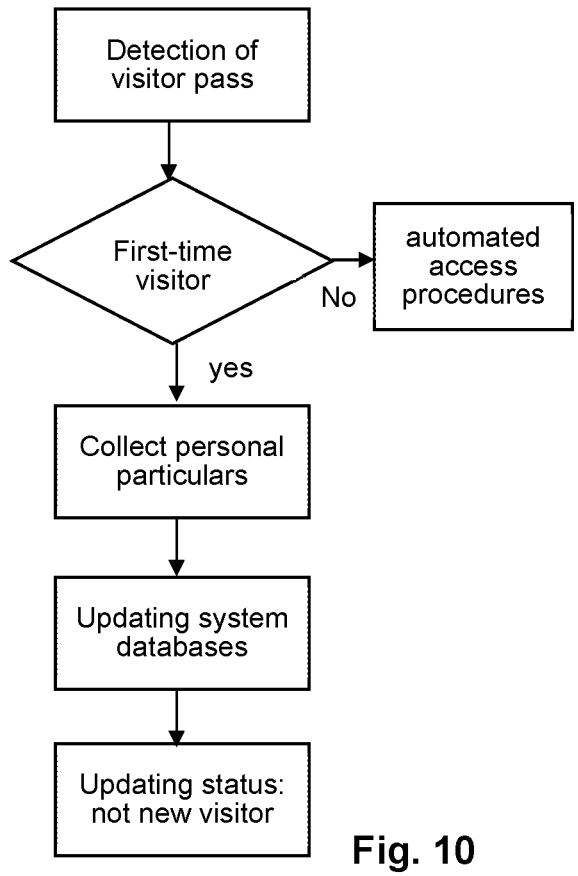
Figure 11:
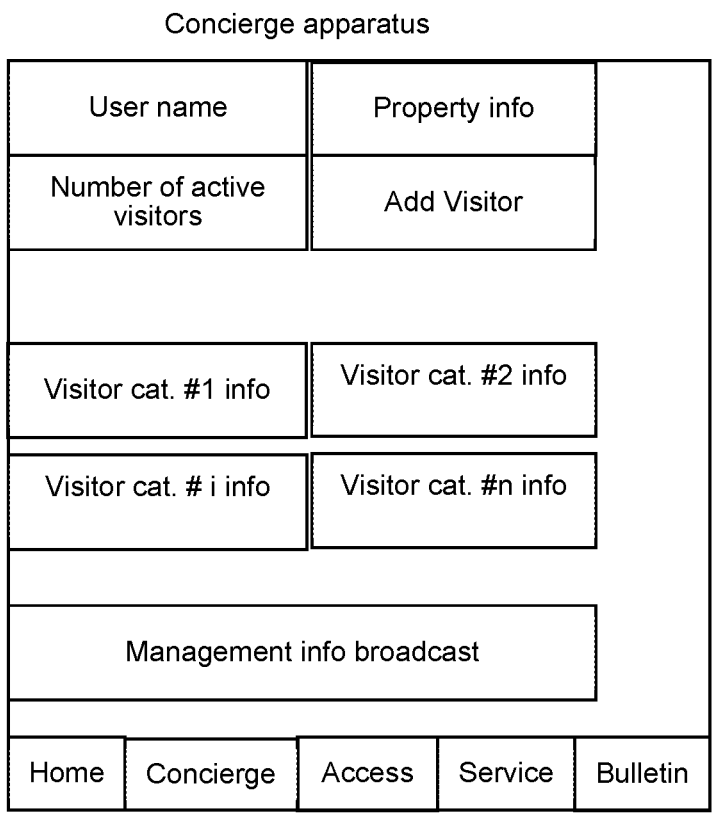
Figure 12:
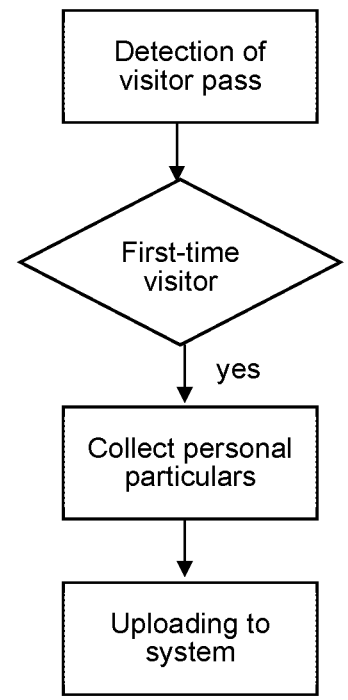

The present disclosure is described by way of example and with reference to the accompanying figures, in which:

FIG. 1 is a block diagram of a property management system of the present disclosure, FIG. 1A shows an example embodiment of the property management system, FIG. 2A is a block diagram of an example system backend of the property management system, FIG. 2B is a block diagram of an example access controller, FIG. 3 is a block diagram showing an example disposition of the property management system, FIG. 4 is a block diagram showing a user frontend in data connection with a tenant frontend, FIG. 5 is a schematic diagram showing an example home page of a user frontend, FIG. 6 is a schematic diagram showing an example add new visitor page of a user frontend, FIG. 7 is a schematic diagram showing an example add visitor information page of a user frontend, FIG. 8 is a schematic diagram showing an example preview page of a sample pass shown on a user frontend, FIG. 9 is a flow diagram showing an example flow of steps for adding a visitor, FIG. 10 is a flow diagram showing an example flow of steps of processing a visitor pass by the system, FIG. 11 is a schematic diagram showing an example preview page shown in a concierge apparatus, and FIG. 12 is a flow diagram showing example operation of a concierge apparatus to collect personal particulars.

DESCRIPTION

An example property management system 100 comprises a system frontend 10 and a system backend 20, as shown in FIG. 1 The system frontend ("Frontend") comprises a plurality of frontend modules each having a designated function or a plurality of designated functions. The system backend ("Backend") is configured as a host system ("Host") and comprises a plurality of backend modules, the backend modules being configured to interact with the system frontend.

The frontend modules of an example system frontend comprises a concierge frontend 110 which is configured to perform concierge functions, a tenant frontend 120 which is configured to interact with tenant apparatuses, a premises frontend 130 which is configured to operate equipment or apparatus on-premises, a visitor frontend 140 which is configured to communicate with visitor apparatuses, and a management frontend 150 which is for use by a property manager as a host of a managed property.

The backend modules of an example system backend comprises a concierge module 210 which is configured to interact with the concierge frontend 110, a tenant module 220 which is configured to interact with the tenant frontend 120, a control module 230 which is configured to interact with the premises frontend 130, a visitor module 240 which is configured to interact with the visitor frontend 140, and a management module 250 which is configured to interact with the management frontend 150. The backend 20 may comprise other modules such as a general-purpose module to facilitate system management and other peripheral functions.

The system backend 20 is a computer-based system or a part of a computer-based system. A computer-based system herein includes a computer-based machine which is configured to perform a set of operations following a set of pre-stored executable instructions. A computer-based machine herein includes a solid-state machine such as a processor-based machine or a microprocessor-based machine which is configured to execute a set of stored instructions to perform flow, decision, control, display and/or other operations. A processor herein may include a solid-state processor such as a microprocessor or an ensemble of solid-state microprocessors. Each processor may be configured as a controller, and more specifically, a system controller. The computer-based system may be a centralized system or a distributed system, for example a cloud-based computer system having a cloud-based data storage and/or cloud-based server. In general, the system backend 20 may comprise a computer operating as a server, for example a local server, or a cluster of computers operating as a cloud server or a virtual cloud server having a cluster of distributed processors. The distributed processors may be geographically distributed, for example, distributed internationally and interconnected by data links such as the Internet. The data storage device may comprise a hard disk operating as a data bank or a cluster of hard disks operating as a distributed data storage such as a cloud storage. A computer generally comprises a solid-state processor or a cluster of solid-state processors, a local data storage and a data communication frontend. The data communication frontend may comprise a wireless data communication frontend, a wired data communication frontend, or a combination of the aforesaid.

A backend module herein may be a dedicated software module which is configured to cooperate with a general-purpose processor of the host system, a dedicated hardware module in cooperation with a dedicated software, part of an integrated management software in cooperation with a general-purpose processor of the host system, or a virtual machine operating an integrated property management software to perform property management functions.

The frontend modules forming the system frontend 10 comprise discrete frontend modules which are physically and/or geographically separated or distributed. For example, the concierge frontend 110 may be located in an entrance hall of a building overseeing the entrance and/or the exit while the management frontend 150 may be located in a back office, which may be inside or outside the building.

The premises frontend 130 may comprise an access frontend which is configured to control entry into a managed property and an exit frontend which is configured to control exit from the managed property. A managed property herein may comprise a single building, a plurality of buildings, a premises, and/or a plurality of premises having a controlled boundary. A controlled boundary includes a machine-operated entrance which is configured to control entry into the property and a machine-controlled exit which is configured to control exit from the property.

The access frontend may comprise an access controller 132 or a plurality of access controllers. The exit frontend may comprise an exit controller 134 or a plurality of exit controllers. An access controller 132 may be outside a building and situated at or near an entrance of the building to control the entrance into the building. An exit controller 134 may be inside a building and situated at or near an exit of the building to control the exit. An access controller 132 and an exit controller 134 are typically located on opposite sides of an entrance or an exit to facilitate entry control and exit control, respectively. An access controller 132 and an exit controller 134 are typically configured to operate a mechanical lock or a mechanical latch to permit authorized entry and exit, respectively.

The system frontend 10 is configured to be managed by the system backend 20. To facilitate remote and/or distributed management, the system frontend 10 and the system backend 20 are configured to be in data communication. To facilitate data communication between the system frontend 10 and the system backend 20, data communication ports are provided on the corresponding frontend modules and backend modules and data communication links are configured to connect the corresponding data communication ports. The data communication links between the system frontend 10 and the system backend 20 may be permanent or temporary.

The system backend 20 in general comprises a processor, a data storage device for long-term storage of data, parameters and instructions, a volatile memory for short-term storage of data, parameters and instructions, as shown in FIG. 2A.

In example embodiments, some frontend modules may be embedded in the system backend. For example, the tenant frontend and the visitor frontend may be embedded in the system backend 20A, as shown in FIG. 1A. With such arrangements, a tenant apparatus and/or a visitor apparatus can communicate directly with the host system via a data communication gateway, which is included in the system frontend 10A. Apart from the aforementioned differences, the host system 100A of FIG. 1A is substantially identical to the host system 100 and the description thereon is incorporated herein by reference.

An example managed property has a property boundary and a property entrance (entrance in short), as shown in FIG. 3. The property is managed by the system and comprises an access controller 132 which is mounted in vicinity of the entrance to facilitate authorized entry into the premises from outside. The property comprises an exit controller 134 which is mounted in vicinity of the entrance to facilitate authorized exit from the property. The access controller 132 and the exit controller 134 are connected to the system backend 20, for example via a backend gateway 20A. The access controller 132 and the exit controller 134 are connected to the concierge frontend 110 by a direct signaling link to facilitate manual control as a fallback.

The access controller 132 may be a computer-based machine and comprising a set of executable instructions in the form of access instructions which is resident on the machine and executable by the machine to form an access module. An example access controller 132 comprises a controller, a data reader, a data communication interface, and optional peripheral circuits and/or peripheral devices, as depicted in FIG. 2B. The controller may comprise a solid-state controller such as a microcontroller. The microcontroller may comprise a solid-state microprocessor which is preprogrammed with a set of instructions and/or commands, and/or logic circuits such as logic arrays which are structured to facilitate flow, control and decision operations. The controller may comprise a volatile memory for storing transient data and a non-volatile memory for storing data, parameters, flow instructions, and/or other machine executable instructions. The data reader may comprise an optical reader comprising a lens or a scanner which is configured to scan an object to form an image of the object, an NFC sensor, an RFID sensor, a keypad connected to a code reader for manual data input, or a selective combination of the aforesaid. The data communication interface is configured to facilitate data communication with the system backend 20, 20A, and may comprise a wireless data communication interface such as a Wi-Fi interface, a wired data communication interface such as an ethernet port, or a combination of the aforesaid. The peripheral devices may comprise a display, a data input terminal, an indicator, a signal generator, a communication interface, and/or other optional devices. The display may be an LCD display. The data input terminal may be a data input keypad or a touch panel when the display is an LCD display. The indicators may include an LED light to indicate operation status. The signal generator may be a buzzer for indicating access eligibility. The communication interface may be an intercom for facilitating communication such as voice communication with a control panel, with a selected destination, or a combination of the aforesaid. To facilitate intercom functions, which require two-way voice and/or video communication, the access controller 132 may comprise a microphone and a speaker, and optionally a camera. The access controller 132 may comprise a rigid housing, for example a weatherproof housing, and may be free-standing, wall-mounted or desk-mounted.

The access controller 132 may be implemented as an access reader or as an access console. The access reader is a basic device having the minimum features while the access console has additional features and/or functions such as intercom functions, alarm functions, SOS functions, data inquiry functions, inquiry functions, display functions, or a combination of any of the aforesaid functions. The access frontend 110 may comprise an access reader, a plurality of access readers, an access console, a plurality of access consoles, or a combination of the aforesaid, but would typically include at least one access console and/or one access reader.

The exit controller 134 may be a computer-based machine comprising a set of exit instructions which is resident on the machine and executable by the machine to form an exit module. Similar to an access controller, the exit controller may comprise a microcontroller, a data reader, a data communication interface, and optional peripheral circuits and/or peripheral devices. The exit controller 134 has a hardware configuration which is similar to that of an access controller 132. Similarly, the exit controller is configured to data communicate with the system backend 20 and/or other portions of the system frontend by means of the data communication interface. The description of the access controller 132 is incorporated herein by reference and applied to the exit controller 134 mutatis mutandis. The exit controller may be in an embodiment of an exit reader which is dedicated for exit control functions only, or may form part of an access management apparatus which has both entry and exit control functions without loss of generality. For example, the access management apparatus may on execution of access instructions function as an access controller and on execution of exit instructions function as an exit controller. Where the exit reader is a purpose-specific apparatus for exit control, the exit reader may not have a display to save costs.

The access instructions are computer executable instructions which are a part of the access module and the exit instructions are computer executable instructions which are a part of the exit module. The access module and the exit module may be submodules of a frontend module or separate modules which can be in data communication with the host frontend 100. The access instructions and the exit instructions are, for example, computer executable instructions which are prestored and which are executed by the controller or controllers of the frontend system during operations.

In example operations, a visitor holding a valid visitor's pass can get entry into the property by presenting the pass to the access controller 132. The host system on validating the visitor's pass will operate the access controller 132 to authorize and permit entry. A visitor holding a valid visitor's pass can exit the property by presenting the pass to the exit controller 134. The host system on validating the visitor's pass will operate the exit controller 134 to authorize and permit entry. In embodiments wherein the access/exit controller has a local data storage device, the host system may upload current visitor information to the local storage device for local retrieval to expedite operations. For example, the host system may update visitor schedules and information on a daily basis, a weekly basis, or an hourly basis without loss of generality.

The tenant frontend 120 is configured to function as an interface between a user apparatus and the host system. A user apparatus is a frontend machine which is configured to interact with the tenant frontend 120 by data communication to perform various functions including property management tasks such as setting property management instructions, obtaining property management information, and/or requesting property management services. Example property management instructions include setting of authorized visitors, scheduling visits of visitors, booking of facilities such as amenity facilities, scheduling of services provided by the property manager, operating a property entrance, etc. Example of property management services includes concierge services, emergency services, catering services, laundry services, etc.

A machine would qualify as a user apparatus and is assumed to be operated by an authorized user. An authorized user is one who is authorized to use the host system due to its nexus with the property. The nexus would mean a right of entry into the premises or part thereof. The premises may include a unit, a flat, a house, an office, a warehouse, a laboratory, and/or a common area such as a function room, etc., of the property which is managed by the system host 100. An authorized user may be an owner, an occupant, a licensee, a licensed resident of the property, an employee, an officer who is authorized to give permission to a visitor, etc. An authorized user typically has a user account and a password to log on to and interact with the host system. The authorized user, or more specifically the user account, has a characteristic identity linked to the specific address or location within the property. Likewise, a user apparatus is linked to the specific location or the specific address of the property as a form of identification. To be recognized as an authorized user, so that the user has a right of access to and interact with the host system, a user would need to be pre-registered with the host system.

A user would require an active user account with the host system in order to access the tenant frontend 120 as a recognized user or as a registered user. For example, an authorized occupant may access the tenant frontend 120 to establish or open a user account with the host system. The user account will be an active account as long as the user remains qualified as an authorized occupant of the premises or a specific part of the premises. In general, the user would require a user name and a password to operate a user account. The user account is linked to the address of the user in which the user is an authorized occupant and for which the user account is registered. The address of the user is an example of a specific destination and the host system would immediately recognize the user account as associated or linked with the specific destination when a user has successfully logged in the user account and is in data communication with the host system. In example embodiments such as the present, the rights, obligations, security level, authorization level, etc., of the user account are associated with the specific destination linked or connected to the specific user account. The tenant frontend 120 may comprise a tenant module to interact with users, or more exactly, user apparatuses. The tenant module may comprise a set of computer executable tenant module instructions to facilitate computer-operated interaction with an authorized user.

A user may interact with the host system via the tenant frontend 120 using a user apparatus 30, as shown in FIG. 4. The user apparatus 30 may be a computer-based apparatus operable to engage in data communication with the tenant frontend 120. The computer-based user apparatus may be a mobile device such as a smart phone, a tablet computer, a laptop computer, a desktop computer, or a dedicated user terminal. The user apparatus 30 may comprise a set of computer executable instructions which is configured to interact with the tenant module 220 and which when executed by the user apparatus 30 is to perform data communication and interact with the tenant frontend 120. The computer executable tenant instructions may be available in the form of an application software ("User App"). The application software may be downloadable from a website or other platforms, such as third-party software distribution platforms. The application software forms part of a user module. The user module is part of a user frontend 160 and the user apparatus on executing the application software forms the user frontend 160.

The user frontend 160 is configured to interact with the host system 100 to perform a plurality of property management related functions such as scheduling of visitor visits, scheduling of services provided by the property manager, requesting services and assistance providable by the property manager, operating a property entrance, booking of amenities, and other services available from time to time. Example of services available from the property management includes concierge services, emergency services, catering services, laundry services, etc.

To interact with the host system, a user would need to be an authorized user having a valid user account and a valid account password to log on to the host system and to interact therewith. An authorized user (or user in short) herein is authorized to register a person as an authorized visitor. An authorized user is typically linked or tied to a specific location to qualify as an authorized user and is authorized due to the location.

An example home screen of an example user apparatus when logged on to an example host system has the example substantive contents as shown in FIG. 5. The example user frontend 160 comprises a smart mobile phone having a touch-responsive screen (or touch screen in short) and a plurality of functional tabs is laid out as touch-operable icons on the screen. Example functional tabs include a Home tab configured for returning to a main screen, a Visitors tab configured for obtaining or editing visitor information, a Concierge tab configured for contacting the concierge, a Service tab configured for requesting services, an Add Visitor tab configured for adding or scheduling visitors. Each functional tab may have an associated software module and the associated software module will be invoked into operation when the functional tab is operated to activate. An operator of the user frontend may activate a functional tab to invoke operation of the function embedded under the functional tab.

To add a visitor to the system, a user may operate the "Add Visitor" tab. The user frontend 160 will switch to display an "Add New Visitor" page when the "Add Visitor" tab is activated. A plurality of visitor categories would be shown for selection by a user when in the "Add New Visitor" page, as shown in FIG. 6. Example categories available for selection may include, for example, "Friends & Family", "Service providers", "Utility workers", and "One-time access".

The user frontend 160 will switch to another data-entry page to facilitate entry of visit information into the host system after the visitor category has been manually selected. The visit information to be entered by a user may include, for example, name and/or identity of a visitor ("Name"), date and time when entry is to begin ("Access start"), date and time when entry permit is to expire ("Access end"), repeating intervals of the permission ("Repeat"), for example, every Monday, every first day of a month, etc., as shown in FIG. 7. The data-entry page may provide options for entry of further information in relation to the scheduled visit, for example, special requests to the property manager in relation to the scheduled visit ("Request"), special remarks to the visitor ("Remarks"), etc. For example, a Request may include reservation of a carparking space and/or a utility for the visitor during a scheduled time of visit. The Remark may include a reminder, note, or a "heads-up" message to the visitor to observe certain codes or house rules etc.

The data-entry page may include a tab to indicate completion of visit data entry. An example tab to indicate completion of visit data entry may be labelled "Save & share Keypass". When the "Save & share Keypass" tab is selected to signify completion of entry of visit information, the entered data will be saved, for example, on the local memory of the user frontend, and the user frontend will switch to a preview page and generate a sample visitor pass for display on the display screen of the user frontend for user review.

The sample visitor pass ("Keypass") may include substantive contents such as those shown in FIG. 8 in a human readable form, for example, name or identity of visitor, the visit information, locations of permitted entry, and guides or instructions for the visitor. The Keypass may include a machine-readable code. The machine-readable code may be a non-human-perceivable access authorization code in which some of the human readable information contained in the Keypass is machine encoded in a non-human readable form to mitigate tampering or counterfeiting. The machine code may be a digitally encoded two-dimensional code such as a QR™ code, a Fourier code, a Bessel code, etc.

The access authorization code may contain personal identification particulars of a visitor for verification by an attendant using for example a concierge console. In some examples, the access authorization code may include biometrics and/or personal identification number of the visitor, and the biometrics may be encoded or domain transformed as a covert security measure or part of a covert security device or measure. The encoded or transformed security measure may be restored to a human readable or a human perceivable form to be useable by the property manager or other designated personnel.

An access authorization code (access code in short) may be an entry authorization code (entry code in short) and/or an exit authorization code (exit code in short). The access authorization code is preferably a two-dimensional machine-readable code which is non-human readable and/or non-human perceivable to provide enhanced security measures. The access authorization code resembles a key code and is also referred to as an access key code. In some examples, the access authorization code may be coded by machine-operated transformation such as Fourier transform so that the access authorization code is non-decodable by naked eyes to enhance security. The access authorization code is preferably a unique code which is only valid for a specified period and will become obsolete and non-reusable after the specified period has expired or is cancelled by the user or the host system (for example if the visitor is no longer authorized to access the premises).

The Keypass includes the specific destination to which the visitor is scheduled or allowed to visit. The example specific destination is the address of the user for which the user or user account is registered in example embodiments.

In some embodiments, the specific destination may be encoded in a human non-readable form for added security.

An example preview page includes a "Share Keypass" tab to facilitate a user to share an electronic copy of the Keypass with the visitor. When a user operates the "Share Keypass"

tab, the user frontend 160 will switch to a communications medium page to facilitate electronic transmission of the Keypass. In example embodiments, icons of a plurality of communication software available for user selection to send the Keypass is shown on the communications medium page. When a communication software is selected, the communication software will operate to transmit the Keypass to a designated electronic address of the visitor. A designated electronic address may be an email address or an address of a communication software account such as Whatsapp™, WeChat™, etc. The Keypass may be sent by means of a weblink. Where the Keypass is sent by means of a weblink, the visitor may download a soft copy of the Keypass by accessing the weblink. A hard copy of the Keypass may be printed where required without loss of generality. In addition, the visit information may be updated from time to time or as required.

A summary on the operation flow for adding a visitor is shown in FIG. 9.

After a person has been duly registered as an authorized visitor, the system will have the visit information stored and will permit entry of the authorized visitor according to conditions of entry given by the user and accepted by the system. To gain actual access permission, an authorized visitor will need to present an access permit to the host system, for example, by presenting the access permit to the access controller for verification. An access permit is also referred to as a "Keypass" herein, since it possesses the combined function of a key and a pass, more specifically a combination of an electronic key to the premises and an electronic pass to show due authorization when necessary or when requested. The access permit may be in a hard form such as a printed ticket or in a soft form, for example, an entry code. The access permit may be delivered by the user or by the host system 100 (or host in short).

The example visitor categories are devised according to relationship between the user and the visitor or function of the visitor. In example embodiments, the visitor categories may be devised according to characteristics of visiting patterns. For example, according to whether the visit or visits are scheduled or unscheduled, regular or irregular, day or night, repeated access or one-time access, short-term or long-term, or a combination of any of the aforesaid.

After a Keypass has been generated and/or shared with or sent to a visitor, the user frontend 160 will return to the Home screen. In example embodiments such as the arrangement shown in FIG. 5, a summary of visitor information including identity or alias of visitors, scheduled time of visits, etc., is shown on the home screen.

A user may elect a functional tab to invoke an embedded function which is a designated function while in the Home screen. When the functional tab is invoked, the controller of the user frontend is to switch the user machine to display a designated page linked to the functional tab so that the user may interact with the host system via the designated page as a GUI (graphic user interface). The embedded function may be invoked by finger touching an icon shown on the display screen of the user machine or other activation mechanisms available from time to time.

For example, a user may operate the "Visitors" tab and the user machine will switch to a Visitors page which is a page designated to show information of visitors which is set and stored in the host system under the user account. The Visitors information may include a listing of visitors and each listing may include name, alias and/or identity of scheduled visitors and selected visit information such as scheduled time or period of visit. The user machine may be configured to show the Visitors page with a listing of active visitors when the "Visitors" tab is operated. The designated Visitors page may be configured to include an "Inactive Visitors" tab and the user machine is configured to show a listing of inactive visitors which are stored in the host system or the user frontend 160. An active user herein means a visitor who is currently authorized to visit the premises. The currency of authorization may mean the current year, the current month, the current week, the current day, the current hour, the current half-hour, the current quarter of an hour, and may be set by the user or the system. An in active visitor means a stored visitor who is not authorized to visit the premises during the currency of operation of the user frontend. The term "premises" herein means an area where a visitor is authorized to enter or visit during active currency of the visit authorization when used with visitor authorization.

For example, a user may operate the "Concierge" tab and the user machine will switch to a Concierge page which is designated to facilitate electronic communication with the concierge. The communication may be real-time, for example, by VoIP, video IP phone, or by communication message software.

After a Keypass has been generated, pertinent information of authorized visitors will be stored on the host system. A Keypass generated by the "Add Visitor" routine is a Visitor's Keypass since it is designated for use by a visitor. The pertinent visitor information to be stored by the host system may include, for example, address and/or identification and/or contact information of the user, name or alias of the authorized visitor, the visitor category, the specified visit conditions, the amenities to be provided, the access authorization code, or a combination of any of the aforesaid.

The user frontend may be configured to provide an overview of visitors. For example, the user frontend may be configured to show a list of active visitors who are authorized to visit the property due to authorization granted by an authorized user account. The list may include a summary of visit information, including name and/or ID, scheduled time(s) of visit, and/or other useful information.

The user frontend may be configured to provide and display a status of visitors such as instantaneous information of visitors. For example, date(s) and time(s) of visit(s) of a visitor, including date(s) and time(s) of entry and exit, duration of stay in the property, and/or whether a visitor is still in the property. The status and information provide useful security information when needed.

When a visitor intends to use a Keypass to enter a property managed by the host 100, the user may present the soft KeyPass to the access controller 132. The access console or the access reader may be connected to a concierge console. The concierge console is part of a concierge frontend which comprises a concierge apparatus and a set of machine executable concierge instructions which cooperate to form a concierge module and a concierge station. The concierge frontend is part of the frontend portion 100 of the host system. The concierge apparatus is a computer-based apparatus comprising a controller which executes the machine executable concierge instructions, and comprises a display for use by an attendant (i.e., concierge) of the host. The concierge frontend forms part of the access frontend and is to execute stored instructions to perform function of the access frontend when a Keypass is presented to the access frontend.

When a visitor intends to use a hard or printed Keypass to enter premises managed by the host system, the user may present the hard or printed Keypass to the access reader.

When a Keypass is presented to the access frontend, for example the access console or the access reader operating in an access control mode, the access frontend will operate to check the visit conditions will determine whether a person is eligible for entry. For example, if the visiting date is outside the specified date range, or the specified time-of day range, access will be denied. The visitor may then seek assistance from the concierge or the user, for example, by means of intercom to conduct voice and/or video calls. The Keypass as an example evidence of access authorization provides enhanced security, speedy authentication, increased certainty, as well as user convenience. For example, a user away from home and in an area of no voice or data communication coverage can issue a Keypass in advance to facilitate subsequent one-time, regular, scheduled, or repeated access to the home of the user without hassle or with hassles substantially mitigated. The anticipatory scheduling of visitor provides substantial user convenience as well as enhanced premises security.

A visitor in possession of a Keypass may present the Keypass to the access controller 132. The Keypass may be a printed copy or a soft version appearing on a visitor apparatus. A visitor apparatus herein may be a mobile device such as a smartphone having a screen on which the Keypass can be displayed. When a Keypass is read or detected by the access controller 132, the access console 132 will seek verification on the validity of the Keypass. When the Keypass is verified as valid, the access controller 132 will operate to permit entry into the premises. In example embodiments, the access controller 132 will transmit a copy of the detected access authorization code to the system backend 20 for verification, and the system backend 20 will reply with a verification outcome of to the access controller 132. The communication between the access controller 132 and the system backend 20 may be by an internal data link or by an external datalink connected by a backend gateway 20A which is connected intermediate the access controller 132 and the system backend 20. The access controller 132 is configured to operate the entrance to permit entry if the outcome of verification is positive. If the outcome of verification is negative, the access controller will deny entry to the premises and the visitor may seek assistance from an assistant, for example, by pressing a button on the access controller and enter into communication with the assistant, such as an on-premises concierge. When an authorized visitor is allowed entry, the entry date and time of the visitor and the exit date and time will be logged, for example, at every access controller and/or by the system. Where an authorized visitor is required to traverse a plurality of access controllers while on premises, the movement details of the authorized visitor will also be logged as an option to enhance security effectiveness.

In example embodiments, a first-time visitor to the property is required to perform additional procedures to complete visitor registration to facilitate automated access by the system. For example, a repeating visitor may be required to provide personal particulars such as biometric data before automated entry by the system is operational. Biometric data herein include facial features, fingerprints, iris pattern, voice, hand geometry, behavioral characteristics, etc.

For example, a first-time authorized visitor on presenting a Keypass to the access controller as shown in FIG. 3 may be requested to contact the property manager so that biometric data can be taken on premises for future convenience. After selected biometric data have been taken, the biometric data will be stored on the host system and linked to the individual visitor. Once the biometric data have been collected and stored, the visitor will no longer be classified as a first-time visitor, and will be classified as a repeating visitor by the host system.

In example arrangements, the system host 20 upon detection of presentation of a Keypass issued to a new visitor having no previous entry records on the host system may invite the new visitor to provide personal particulars such as biometric data for future convenience. The invitation may be made by the system host 20 via the concierge frontend 110 which is attended by a concierge. When the concierge is notified of the presence of a new visitor at the entrance, the concierge may invite the new visitor for collection of biometric data for future convenience. If the invitation is accepted, selected biometric data will be collected and stored in the host system and the visitor will be classified as a repeating visitor by the system host. If the invitation to provide biometric data on premises is declined, the attendant may invite the new visitor to provide alternative personal particulars such as personal identification information for proof of identity. If the alternative invitation is accepted, the attendant may invite the visitor to permit keeping of the personal identification information, such as a copy of identification card or passport, as an alternative to the collection of biometric data. If the alternative invitation is accepted, the personal identification information will be stored in the host system and the visitor will be classified as a repeating visitor by the system host. Where a managed property requires enhanced security measures, both biometric data and personal identification information may be collected and stored in the host system for subsequent retrieval for automated verification of identity of a visitor. If all the invitations to provide personal particulars for proof of identity is declined, the concierge may request the user who gave authorization to confirm allowability of entry.

The collection of personal particulars may be performed by an attendant operating the concierge frontend 110 which is equipped with equipment for collection of the selected personal particulars.

After the personal particulars of a visitor have been collected and stored in the host system, the visitor will no longer be classified as a new visitor, and will be classified as a repeat visitor, as shown in FIG. 10. The system, or more exactly the access controller 132, upon detection of a Keypass issued to a repeat visitor will execute automated entry procedures such as automatically opening the entrance to permit entry into the premises, for example, upon successful verification of the personal particulars. The personal particulars may be verified by automated operation of the access console as a convenient example.

The host system maintains a database of visitors. The database may contain identity and/or personal particulars of visitors, user accounts which have given authorization to particular visitors, and/or the category of a visitor assigned by a particular user account. For example, a visitor may be categorized as a utility worker by a user account but a relative or friend by another user account.

The database of visitors may not restrict to visit information in connection with a specific user account, and may include visit information in connection with an authorized visitor. For example, a utility worker may be authorized by a plurality of user accounts to visit a corresponding plurality of destinations within the property. The system host may be configured to merge the destination information and/or the visit schedules on a single pass, for example, by merging on a single access authorization code. In some embodiments, separate passes are issued to the same visitor when authorizations are given by a plurality of user accounts to maintain privacy.

A visitor may be restricted to visit a specific destination within the premises, for example, a home only, a public area only, or a club house only. The system may be configured to restrict access only to a locality in which the specific destination is situated. For example, the access frontend may authorize the Keypass to activate a lift between the entry floor and the floor in which the specific destination is situated. In some embodiments, the host system may execute stored instructions to design a designated path for the visitor to access the specific destination. In some embodiments, the host system may trigger an alert signal if the Keypass is detected in a locality outside the authorized locality or outside the designated path. The visitor information may be stored in the system backend after data entry has completed and the visitor has been registered as an authorized visitor. The visitor information will be retrieved and stored locally at the frontend portion 10 when a scheduled visitor becomes a current visitor and has a status of a current visitor. A current visitor is a scheduled visitor who is inside the premises, for example, who used the Keypass to enter the premises. The visitor information of a current visitor will be stored locally and available for quick data access during the duration when the status of a scheduled visitor remains as a current visitor who is inside the premises, that is, when the current visitor has checked in but not checked out. In some embodiments, for example where the Keypass comprises a wireless transmitter such as an RFID tag, the frontend portion may operate to keep track on the movement path and/or instantaneous location of the current visitor.

When the visitor leaves the premises at end of the visit, the visitor will present the Keypass to the Exit Reader. The Exit Reader on detecting the Keypass may read the access authorization code and communicate with the system host 20 to verify that the visitor is an authorized visitor who is authorized to leave. If the visitor is confirmed as an authorized visitor who is authorized to leave, the system host 20 will update the exit record and transmit an exit permission signal to the Exit Reader to permit exit. Otherwise, the visitor may need to contact the concierge frontend to exit the premises. An authorized visitor may not have an authorization to leave if an adverse situation such as stealing or damages which triggers an alarm event arises due to its visit.

If the visitor holds a Keypass which permits repeated entry, the visitor may present the Keypass again to enter the premises again, for example upon satisfactory verification of personal particulars. The host will track whether the visitor has left the premises after entry and shall store the entry and exit records in its data storage for future reference and/or security purposes. If the visitor holds a single-time or one-time Keypass, for example the "One-time Access" Keypass, the Keypass will be void after the entry and not re-useable to gain entry again. The visitor would need to obtain a new access permission in the form of a new Keypass in order to gain repeated entry into the premises.

Where a visitor has visited the premises before and has pertinent personal particulars already stored on the system host, the visitor is a "repeat" visitor and there is no need to capture the pertinent personal particulars again, unless some or all of the pertinent personal particulars have for example become obsolete or outdated, in which case the pertinent personal particulars may need to be obtained and/or captured again. Example pertinent personal particulars may include a photograph of the visitor showing the visitor's face or facial features, personal identification information such as ID card number, passport number, driver license number, age, image of identifications, personal biometrics such as voice or finger print, complexion, or a combination of any of the aforesaid, depending on the security level required.

A visitor not in possession of a Keypass may contact a user for issue. For example, a visitor at an entrance such as a door to the premises may contact the user by telephone or via the access console. The user upon receipt of the call may activate the "Add Visitor" procedure and add a visitor. The visitor may enter a managed entrance and collect a Keypass printed by a ticket printer. The ticket printer may be a peripheral device connected to the management apparatus, for example, access console, the access reader or the concierge console. After the visitor has collected the printed Keypass, the visitor may enter and leave the premises as an authorized visitor in the same or similar way as an authorized visitor holding a soft Keypass if the visitor is a repeat visitor. If the visitor is a first-time visitor, the visitor would need to proceed to visitor registration at the concierge frontend and provide pertinent personal particulars for record. The concierge frontend will then proceed to operate to obtain or capture the pertinent personal particulars and to transmit the obtained and/or captured pertinent personal particulars to the system host similar to the procedures performed by a first-time visitor holding a soft Keypass. After the pertinent personal particulars have been received by the system host, the system host will transmit an entry permission signal, for example, a "ENTER" signal, to the concierge frontend and authorize the concierge frontend to permit entry of the visitor. The exit procedures in relation to a printed Keypass holder is same as those of a soft Keypass holder and the exit procedures and processes are incorporated herein by reference.

The concierge frontend may comprise a concierge apparatus. The concierge apparatus may be in addition to or as an alternative to the concierge console. The concierge apparatus may be a portable machine such as a smart phone executing a concierge application software which may be referred to as "Concierge App". The concierge application software comprises a set of concierge instructions which are machine or computer executable instructions for execution by a process or the smart phone or other computer-operated machine. A smart phone herein comprises a housing, a central processor which may a solid-state microprocessor or a cluster of solid-state micro-processor, volatile and non-volatile memories, a display, an image capture apparatus such as a digital camera, and a telecommunication frontend for facilitating wireless data communication.

In order to activate the concierge apparatus, a user would need to activate the Concierge App and log on to the system host using an assigned concierge account and password. The user is typically an attendant who is part of the property management team. The attendant, who is conveniently referred to as a concierge in the present examples, may operate the handheld concierge apparatus to view property management related information such as information of current visitors and activities relating to property management. After the attendant has logged in to the system, a home page, which is a first page with substantive contents shown in FIG. 11, will pop up on the display screen of the concierge apparatus. Where the concierge is designated for a specific locality within the premises managed by the host system, for example, a specific tower or building which is part of many towers and/or buildings forming the premises, the information displayed on the home page may include information of particular relevance to the specific locality as a matter of user convenience. For example, real-time visitor information such as the total number of current visitors who are currently on premises, activities in public area of the specific locality and/or the premises, lost and found, weather warnings and other useful information relating to property management may be displayed on the home page.

The example concierge apparatus home page, as shown in FIG. 11, displays a plurality of options available for selection by an attendant. The options are displayed as icons and the icons may be activatable by finger touching and/or other activation methods without loss of generality. For example, optional features such as service requests of tenants may be viewed by activating (for example, touching) an icon bearing the label "Services", visitor information may be viewed by activating an icon bearing the label "Access", property management information such a log books may be viewed by activating an icon bearing the label "Concierge", and notices and/or bulletins may be viewed by activating an icon bearing the label "Bulletins". For example, the visitor information is organized under icons showing the title of visitor categories, such as "Friends & Family" (visitor category #1), "Service providers" (visitor category #2), "Utility workers" (visitor category #3) and "One-time access" (visitor category #4). The home page includes an icon comprising four corners, icons to view visitor information in relation to the various categories of visitors, the name and/or identification of the attendant using the concierge apparatus, and the responsible locality of the attendant or the concierge station. The four cornered icon (or scan icon), when touch activated, is to scan a security code such as an entry authorization code and to transmit the scanned result to the host system for analyses, authentication and/or verification. The home page also includes an "Add Visitor" icon to allow an attendant to add visitors at the concierge frontend.

In example operation of the concierge apparatus on visitor management, the attendant may operate the concierge apparatus to capture an image of the access authorization code by touching the scan icon. When the scan icon is touched, a code-scan routine comprising a set of machine executable scan instructions is activated. When the code-scan routine is activated on the concierge apparatus, a GUI showing an area defining an alignment window for alignment with an access authorization code will be displayed on the screen of the concierge apparatus. After a code has been aligned, the concierge apparatus will operate to capture an image of the access authorization code upon detection of the code by the concierge apparatus. The concierge apparatus will then operate to determine whether the access authorization code is valid, whether the access authorization code is assigned to a tenant or a visitor, whether the code should be for entry or exit. In this regard, when an access authorization code has been used to enter the premises but there is no exit record after that entry, the host system would on checking the access records classify the access authorization code as an exit code for exit. Conversely, when an access authorization code was used to exit the premises but there is no entry record after that entry or there is no entry record at all, the host system would on checking the access records classify the access authorization code as an entry code for entry.

If the access authorization code is an entry code of a first-time visitor and validated ("validated entry code"), the concierge apparatus will proceed to first-time visitor procedures and record the pertinent personal particulars of the first-time visitor. After the pertinent personal particulars of the first-time visitor has been taken and stored, the concierge apparatus will generate a visitor profile showing the visit conditions of the current visit and the pertinent personal particulars. The example pertinent personal particulars recorded in this example procedure may comprise personal identification number such as an identification card number and a photograph of the visitor showing face of the visitor. The concierge apparatus will operate to permit entry, to record entry time, and transmit the visitor profile, including the pertinent personal particulars to the host system, for example, the system backend 20. The personal particulars collected will be uploaded to the system for processing in connection with the visitor pass, as shown in FIG. 12.

If the validated access authorization code is for a repeat visitor holding a Keypass verified by the host system, the concierge apparatus will operate to retrieve the or some of the pertinent personal particulars for confirmation and/or verification, preferably covertly. The pertinent personal particulars may include, for example, the identification card number and photograph of the visitor.

If the access authorization code is presented for exit and validated, the concierge apparatus will operate to retrieve the or some of the pertinent personal particulars for confirmation and/or verification, and to permit exit and record exit time if the outcome of confirmation and/or verification is positive.

If the access code cannot be validated, the validation process is failed and the attendant will investigate the reason for failure and seek resolution. For example, where the access code failed verification due to breach of the specified visit conditions, for example, the visit period has expired, the concierge apparatus will display the reason and the attendant will communicate with the visitor and/or the user for resolution of issues.

The attendant may also operate the concierge apparatus to check visitor status and statistics, for example, number of on-premises visitors, their categories, etc. For example, the attendant may operate the concierge apparatus to view a picture of a visitor who is in premises as and when necessary.

The attendant may also operate the concierge apparatus to add visitors, for example, on verbal instructions of an authorized user such as a tenant. To add visitors, the attendant will need to activate an "add visitor" routine, which is labelled with an add visitor icon on the home screen of the concierge apparatus. The add visitor GUI on the concierge apparatus, is identical in substance to that of a user apparatus, except that the specific destination has to be entered by the attendant while the specific destination is automatically generated on the user apparatus.

While the disclosure has been made with reference to example embodiments, the embodiments are non-restrictive examples which should not be used to restrict scope of the disclosure. For example, while the disclosure has described a visitor management apparatus, the visitor management apparatus can be a standalone apparatus or a modular part of a property management system.

While the example user apparatus is tied to the address of user in which the user is a legitimate or authorized occupant, the user may provide visitor authorization to permit a visitor to visit a destination which is not the address of the user. For example, the club house or other public areas or utilities of the premises such as a banquet room, event room, conference room, a sports facility, a library or other amenities. Where the destination requires a lower level of security scrutiny or security monitoring, the first-time visitor registration procedure may be dispensed with until the visitor is to visit a destination have a higher security monitoring level.

The invention claimed is:

1. A property management apparatus for managing visitor access to premises managed by the apparatus, the premises being a property including specific addresses and common areas including amenities; wherein the apparatus comprises a data storage, a processor and a data communication frontend; wherein the apparatus is configured to execute stored instructions to perform data communication with a user frontend and to give the user frontend an authorization to register a person as an authorized visitor to visit an accessible destination within the premises, and to receive visit information of a proposed visitor from the user frontend through a data communication link, to store the visit information on the data storage, and to register the proposed visitor as an authorized visitor after receipt of the visit information; wherein the visit information comprises location information of the accessible destination within the premises and at least a visit condition; wherein the user frontend is pre-registered with the apparatus, is configured for operation by an authorized user, and has an associated address which is a specific address; wherein the authorized user is a person who is authorized to use the apparatus due to its nexus with the property, including a right of entry into the premises and the associated address, and the authorization given by the apparatus to the user frontend is commensurate with the associated address of the user frontend; wherein the user frontend is pre-registered as associated with the associated address which is an associated location within the premises that the authorized user has a right of entry, and the apparatus is to operate to identify the associated address upon data communication connection with the user frontend; wherein the apparatus is to generate a machine-readable visitor pass comprising the visit information and visitor identity; and wherein the accessible destination includes the associated location and/or the amenities within the premises;

wherein the apparatus comprises a tenant frontend which is to execute stored instructions to data communicate and interact with the user frontend; wherein the tenant frontend is to determine the associated address which is connected with the user frontend when data communication between the user frontend and the tenant frontend is established; and wherein the tenant frontend is to operate to accept the visit information which is provided by the user frontend and to forward the visit information together with the associated address to a system backend where a database of visit information connected with the premises is stored.

2. The property management apparatus according to claim 1, wherein the apparatus comprises a computer-operated access controller and the access controller comprises a microcontroller, a data reader and a data communication interface; wherein the data reader is to operate to detect or read the visit information on the visitor pass, the visit information further including a visit schedule, and the microcontroller is to operate to transmit the visit information detected or read to the processor through operation of the data communication interface; wherein the processor is to execute stored instructions to determine whether the visitor pass is effective and to operate the access controller to permit or deny entry to the premises according to outcome of determination; and wherein the outcome of determination is positive and entry is authorized by the apparatus if the visitor pass is read by the apparatus within the visit schedule and negative and entry is denied by the apparatus if read outside the visit schedule.

3. The property management apparatus according to claim 2, wherein the apparatus is configured to set a designated path for the authorized visitor to proceed to the accessible destination, and to trigger an alert signal if the authorized visitor is outside the designated path.

4. The property management apparatus according to claim 1, wherein the visitor pass comprises an access authorization code, and wherein the apparatus is to detect or read the access authorization code, to extract the visit information using the access authorization code, and to determine whether the visitor pass is effective with reference to the access authorization code.

5. The property management apparatus according to claim 4, wherein the access authorization code is a digital code which is not human perceivable.

6. The property management apparatus according to claim 4, wherein the access authorization code is a unique code which is specific to the visit information and generated by the apparatus.

7. The property management apparatus according to claim 1, wherein the apparatus comprises an on-premises module which is to execute stored instructions to obtain and store personal particulars of a person holding the visitor pass on the person's first visit to the premises upon arrival at the premises, and to register the person as an authorized visitor on a visitor database on the first visit.

8. The property management apparatus according to claim 7, wherein the apparatus is to operate to connect the personal particulars with the visit information, and to retrieve the personal particulars during subsequent visits by the authorized visitor.

9. The property management apparatus according to claim 1, wherein the visit information comprises a visitor category which is assigned to the visitor by the user frontend when in data communication with the apparatus.

10. The property management apparatus according to claim 1, wherein the apparatus is to operate to give the user frontend an authorization to register a person as an authorized visitor to the accessible destination, and wherein the authorization is commensurate with the associated address of the user frontend.

11. The property management apparatus according to claim 1, wherein the apparatus is to transmit visitor information specific to the associated address of the user frontend when the user frontend is in data communication with the apparatus, and wherein the visitor information includes visit information of a scheduled visit or scheduled visits, and/or status of a scheduled visit including whether an authorized visitor is on premises, has entered the premises, and/or has left the premises.

12. The property management apparatus according to claim 1, wherein the tenant frontend is linked to the associated address as an authorizing source.

13. The property management apparatus according to claim 1, wherein the apparatus is to operate to determine whether the authorized visitor is a first-time visitor upon detection of the visitor pass and to proceed to procure first-time visitor registration procedures if the authorized visitor is determined by the apparatus as a first-time visitor.

14. The property management apparatus according to claim 1, wherein the apparatus comprises a concierge frontend which is operable by an attendant to retrieve stored personal particulars of a visitor for verification when a visitor pass is presented to the apparatus.

15. The property management apparatus according to claim 1, wherein the apparatus is to operate to classify the visitor pass as an entry pass or as an exit pass, wherein the apparatus is to classify the visitor pass as an entry pass if the visitor pass has no entry record after a last exit or no entry record at all; and wherein the apparatus is to classify the visitor pass as an exit pass if the property management apparatus has no exit record after an entry.

16. The property management apparatus according to claim 1, wherein the apparatus is part of or is for cooperation with a computer-operated property management apparatus which forms part of a property management system managing the premises.

17. A property management system comprising a property management apparatus for managing visitor access to premises managed by the apparatus, the premises being a property including specific addresses and common areas including amenities; wherein the apparatus comprises a data storage, a processor and a data communication frontend; wherein the apparatus is configured to execute stored instructions to perform data communication with a user frontend and to give the user frontend an authorization to register a person as an authorized visitor to visit an accessible destination within the premises, and to receive visit information of a proposed visitor from a user frontend through a data communication link, to store the visit information on the data storage, and to register the proposed visitor as an authorized visitor after receipt of the visit information; wherein the visit information comprises location information of the accessible destination within the premises and at least a visit condition; wherein the user frontend is pre-registered with the apparatus, is configured for operation by an authorized user, and has an associated address which is a specific address; wherein the authorized user is a person who is authorized to use the apparatus due to its nexus with the property, including a right of entry into the premises and the associated address, and the authorization given by the apparatus to the user frontend is commensurate with the associated address of the user frontend; wherein the user frontend is pre-registered as associated with the associated address which is an associated location within the premises that the authorized user has a right of entry, and the apparatus is to operate to identify the associated location upon data communication connection with the user frontend; wherein the apparatus is to generate a machine-readable visitor pass comprising the visit information and visitor identity; and wherein the accessible destination includes the associated location and/or the amenities within the premises; wherein the property management system comprises a computer-operated access frontend, a computer-operated concierge frontend, and a computer-operated backend for data storage; wherein the concierge frontend is on premises and configured to perform registration procedures to activate the visitor pass for a first-time authorized visitor upon arrival, and to classify an authorized visitor as a non-first-time visitor after completion of the registration procedures;

wherein the apparatus comprises a tenant frontend which is to execute stored instructions to data communicate and interact with the user frontend; wherein the tenant frontend is to determine the associated address which is connected with the user frontend when data communication between the user frontend and the tenant frontend is established; and wherein the tenant frontend is to operate to accept the visit information which is provided by the user frontend and to forward the visit information together with the associated address to a system backend where a database of visit information connected with the premises is stored.

18. A user module for operating with a property management apparatus for managing visitor access to premises managed by the apparatus; wherein the apparatus comprises a data storage, a processor and a data communication frontend; wherein the apparatus is configured to execute stored instructions to receive visit information of a proposed visitor from a user frontend through a data communication link, to store the visit information on the data storage, and to register the proposed visitor as an authorized visitor after receipt of the visit information; wherein the visit information comprises location information of an accessible destination within the premises and at least a visit condition;

wherein the user frontend is pre-registered as associated with an associated location within the premises, and the apparatus is to operate to identify the associated location upon data communication connection with the user frontend; wherein the apparatus is to generate a machine-readable visitor pass comprising the visit information and visitor identity; and wherein the accessible destination includes the associated location and/or amenities within the premises; wherein the user module comprises a computer-based user apparatus executing a set of stored user frontend instructions, wherein the user module is to establish data communication with the property management apparatus using a computer-operated account which is registered for the associated address, wherein the user module is operable to provide visitor authorization and to data communicate the visitor authorization to the property management apparatus, and wherein the visitor authorization is connected with or in respect of the associated address; wherein the user module includes a user frontend which is pre-registered with the apparatus, is configured for operation by an authorized user, and has an associated address which is a specific address; wherein the authorized user is a person who is authorized to use the apparatus due to its nexus with the property, including a right of entry into the premises and the associated address, and the authorization given by the apparatus to the user frontend is commensurate with the associated address of the user frontend;

wherein the apparatus comprises a tenant frontend which is to execute stored instructions to data communicate and interact with the user frontend; wherein the tenant frontend is to determine the associated address which is connected with the user frontend when data communication between the user frontend and the tenant frontend is established; and wherein the tenant frontend is to operate to accept the visit information which is provided by the user frontend and to forward the visit information together with the associated address to a system backend where a database of visit information connected with the premises is stored.

19. A user module according to claim 18, wherein the user module is operable to assign a visitor category to a visitor and to data communicate the visitor category to the property management apparatus, wherein the user module is operable to search for visit information on activation of a tab on the user module by digital data communication with the property management apparatus, and wherein the user module is to receive the visit information data from the property management apparatus by means of digital data communication.

* * * * *